United States Patent [19]
Felder

[11] 4,062,507
[45] Dec. 13, 1977

[54] SLOPE LANDING COMPENSATOR SYSTEM

[76] Inventor: Donald W. Felder, 1153A Drennan Park, Fort Campbell, Ky. 42223

[21] Appl. No.: 765,196

[22] Filed: Feb. 3, 1977

[51] Int. Cl.² .................. B64C 25/22; B64C 25/58
[52] U.S. Cl. .................. 244/17.17; 244/104 FP; 267/65 D
[58] Field of Search .......... 244/17.17, 104 R, 104 FP, 244/102 SS, 102 R, 100 R; 280/6 H, 6.11; 180/41; 267/65 D, DIG. 2; 137/461, 462, 517

[56] References Cited

U.S. PATENT DOCUMENTS

| | | | |
|---|---|---|---|
| 2,179,144 | 11/1939 | Buttner | 137/517 |
| 2,933,271 | 4/1960 | Maltby | 244/17.17 X |

FOREIGN PATENT DOCUMENTS

| | | | |
|---|---|---|---|
| 819,026 | 10/1937 | France | 244/104 FP |
| 483,365 | 7/1953 | Italy | 280/6 H |

*Primary Examiner*—Barry L. Kelmachter

[57] ABSTRACT

A slope landing compensator system for allowing helicopters with air/oil strut type landing gear to land on inclined surfaces while maintaining the air frame in a more upright attitude, comprising two pressure responsive valves, an interconnecting line with a conventional on/off valve between the two valves. A pressure responsive valve is mounted to each of the main landing gear struts with an interconnecting line between the two so that during landing on an inclined surface, as the up slope gear touches the surface and as the strut compresses the internal pressure travels across to the down slope strut until the up slope strut has compressed to a predetermined pressure at which time pressure is sufficient to close the pressure responsive valve of the up slope strut to give firm support and so that all the pressure is not transmitted to the down slope strut and allow the up slope strut to bottom out. The down slope strut now has a higher pressure and will compress less than normal, allowing both main landing gears of the helicopter to be firmly in contact with the surface while maintaining the air frame in a more upright attitude.

1 Claim, 7 Drawing Figures

SLOPE LANDING COMPENSATOR SYSTEM

SUMMARY

The present invention pertains generally to air craft landing gears and more particularly to helicopter landing gears for landing on inclined surfaces.

It has long been the objective of the helicopter industry to develop helicopters capable of landing on rough terrain for rescue, mercy missions and military operations.

It is therefore a primary objective of the present invention to provide a slope landing compensator system to allow helicopters to land on steeper inclines with heavier loads.

It is a further object of this invention to provide a system which automatically compensates for variations in inclined landing surfaces.

It is yet another object of the present invention to provide a slope landing compensator system which will automatically equalize strut pressures for level terrain operations.

It is yet another object of the present invention to provide a slope landing compensator system which is simple and durable in construction and which can be manufactured and maintained at a reasonable cost.

It is yet another object of the present invention to provide a pressure responsive valve, compatable with presently produced struts to allow installation of the slope landing compensator system without major modification.

Having in mind the above and other objects that will be evident from an understanding of this disclosure, the present invention comprises the combinations and arrangements of parts illustrated in the presently preferred embodiments of the invention which are hereinafter set forth in sufficient detail to enable those persons skilled in the art to clearly understand the function, operation, construction and advantages of it when read in conjunction with the accompanying drawings.

DETAILED DESCRIPTION

Figure 1:
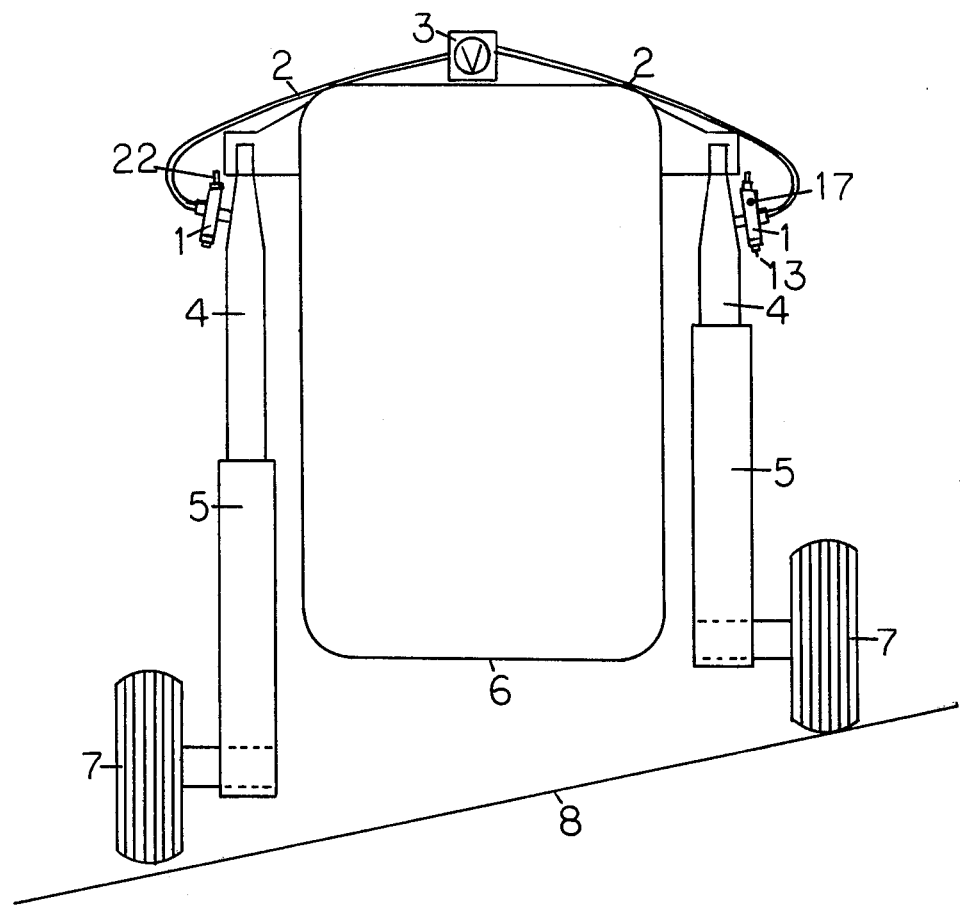
FIG. 1 is a cross sectional view of a helicopter air frame, showing the position of the landing gear and components of the slope landing compensator system during landing on an inclined surface.
Figure 2:
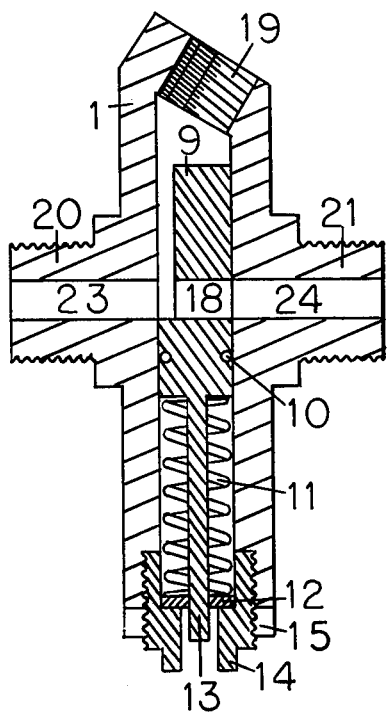
FIG. 2 is a cross sectional side view of a pressure responsive valve in the open position.
Figure 3:
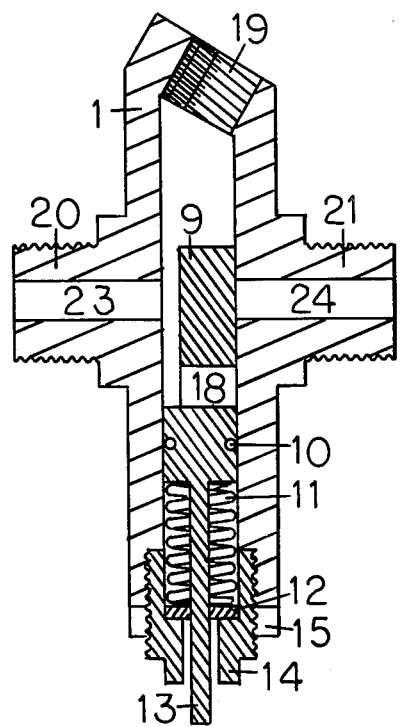
FIG. 3 is a cross sectional side view of a pressure responsive valve in the closed position.
Figure 4:
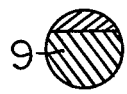
FIG. 4 is a top view of the valve working member.
Figure 5:
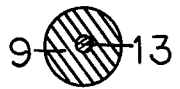
FIG. 5 is a bottom view of the valve working member.

As seen in FIG. 1, the slope landing compensator system comprises a pressure responsive valve assembly as seen in FIG. 2 and 3, spring loaded open and pressure activated closed, installed in the service port of each strut piston 4 of a pair of conventional air and oil, main landing gear struts, one on each side of the airframe 6, by screwing the threaded protrusion 20 of the pressure responsive valve housing 1 into the threaded receptacle. An interconnecting line 2 connects the valve outlet passage 24 to the valve outlet passage 24 of the opposite valve housing 1. The interconnecting line 2 has a conventional open/close pilot operated valve 3 so that the pressure responsive valves can be isolated from each other when the slope landing compensator system is not being utilized.

Figure 6:
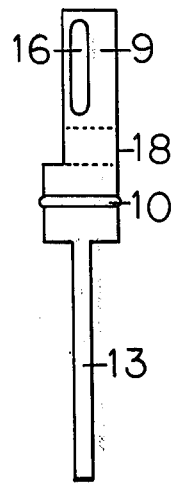
FIG. 6 is a side view of the valve working member, removed from the valve housing.
Figure 7:
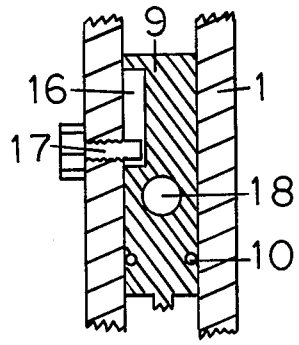
FIG. 7 is an explanatory view depicting the position of the valve guide pin in the valve guide slot with the working member in the open position.

The pressure responsive valve assembly as seen in FIG. 2 and 3 is comprised of a valve housing 1 of cylindrical shape with a threaded protrusion 20 on one side, of a size to accommodate the threaded service valve receptacle of the strut. The threaded protrusion 20 has passageway 23 through its center so as to provide communication between the interior of the strut and the interior of the valve housing 1. On the opposite side of the valve housing 1 is another threaded protrusion 21 with passage 24 through its center to accommodate interconnect line 2. Through the center portion of valve housing 1 is a bore extending for major portion of its length, to accommodate valve working member 9. At the top portion of valve housing 1 is a threaded receptacle 19 to accommodate a conventional strut service valve 22 to allow normal pneumatic inflation servicing of the strut with the pressure responsive valve 1 installed and to serve as a plug of receptacle 19 when the strut is not being serviced and is in use. Valve receptacle 19 is off set at an angle to allow easier access. Housing 1 has a threaded valve guide pin receptacle through a side wall to accommodate valve guide pin 17 which protrudes into the valve guide slot 16 of the valve working member 9 as illustrated in FIG. 7. The valve housing has a threaded bore at its lower end to accommodate valve spring tension adjustment plug 14. The valve working member 9 as seen in FIG. 2 through 7 is of generally cylindrical shape and of a size to accommodate the center bore of valve housing 1. Valve working member 9 has a cross bore 18 to provide communication between passageway 23 and passageway 24 when valve working member 9 is in the up position. Valve working member 9 has a cutaway on its side of approximately one quarter of its diameter, extending from the bottom of cross bore 18 to the top end of valve working member 9 to provide continuous communication between passageway 23, service valve receptacle 19 and the top of valve working member 9 to allow normal pneumatic inflation servicing of the strut through the service valve 22 installed in receptacle 19 while the pressure responsive valve 1 is in the closed position and to provide a path for pressure to reach the top of valve working member 9, which provides a pressure responsive surface since pressure is restricted from any opposing surface, so as to force valve working member 9 down, compressing spring 11, moving passageway 18 out of alignment with passageways 23 and 24 to close the pressure responsive valve 1, when sufficient internal strut pressure is created by the compression of the strut. Valve working member 9 has a valve guide slot as seen in FIG. 6 and 7, in its side extending from slightly above cross bore 18 to slightly below its top, of a size to accommodate valve guide pin 17, for the purpose of acting as a up and down stops for valve working member 9 and to maintain radial alignment of cross bore 18 with passageways 23 and 24. Valve working member 9 has a seal 10 as seen in FIG. 2, 3 and 6 around its circumference approximately midway between cross bore 18 and its bottom to maintain a seal between the valve working member 9 and the inner wall of the valve housing 1 as valve working member 9 works. Valve working member 9 has a valve position indicator pin 13 as seen in FIG. 2, 3 and 6, extending from its bottom center, of sufficient length as to extend through spring tension plug 14 when the valve is closed so as to give a visual check of valve operation during use and during installation and maintaince for adjustment purposes. A compression type spring 11 is installed between the bottom of valve working member 9 and spring tension adjustment plug 14, around valve position indicator pin 13, to spring load the valve working member 9 to the open position. A dust seal 12 of felt like material is installed between the bottom of spring 11 and plug 14 so as to allow air in that portion of the valve assembly to be expelled and taken in as the valve working member 9 works up and down without allowing excessive amounts of foreign matter to enter. Spring tension adjustment plug 14 is threaded around its outer circumference and of a size to accommodate a threaded bore in the lower portion of the valve housing 1. Plug 14 has a bore through a portion of its length of a size to accommodate the valve spring 11 and dust seal 12. Plug 14 has a through bore to allow indicator pin 13 to pass through and of a size to allow air to pass freely between the pin 13 and the bore to prevent pressure and vacuum build up at the bottom of valve working member 9 that could restrict pressure responsive valve 1 operation. A lock nut 15 is installed around plug 14 so as to lock plug 14 in place after desired adjustment is obtained.

During operations utilizing the slope landing compensator system, conventional valve 3 is placed in the open position. As the up slope wheel comes in contact with the inclined surface 8 as seen in FIG. 1, strut piston 4 compresses into strut housing 5 increasing the pressure inside the up slope strut causing, as the air remains in the upper portion of the air and oil type strut due to gravitational forces, only pneumatic pressure to travel through passageways 23, 18 and 24 through line 2, valve 3, line 2 into the pressure responsive valve of the down slope strut through passageways 24, 18 and 23 into the down slope strut. When the up slope strut has compressed to a predetermined internal strut pressure, which travels through passageway 23, up past the cutaway side of valve working member 9, to the top of valve working member 9, sufficient to act on the top end of valve working member 9 which serves as pressure responsive surface, forcing it down, compressing spring 11, moving passageway 18 out of alignment with passageways 23 and 24, in effect closing the valve and isolating the up slope strut from the rest of the system. As the helicopter continues to settle, the up slope strut will further compress untill it will support the load on that side. The down slope gear will be in contact with the surface by this time even though not fully supporting the load. As the load is allowed to settle on the down slope strut, the strut will compress to a predetermined internal strut pressure which causes pneumatic pressure to travel through passageway 23, up past the cutaway side of valve working member 9, to the top of valve working member 9 which serves as the pressure responsive working surface as pressure is restricted from any opposing surface, causing the valve working member 9 to move downward, compressing spring 11, moving passageway 18 out of alignment with passageways 23 and 24 and the pressure responsive valve of the down slope strut will close, and the down slope strut will compress considerably less than the up slope strut when its pressure responsive valve 1 closes and supporting the full load due to the volume of pneumatic pressure previously transmitted from the up slope strut to the down slope strut, maintaining the air frame in a more upright attitude. As both pressure responsive valves close prior to supporting the weight of the entire load, the interconnecting line 2 and valve 3 are not subjected to the pressure of the full load. In the event an inclined surface is too steep for the slope landing compensator system to compensate for the incline, the standard slope landing procedures can be employed for the particular type helicopter, using the slope landing compensator system to augment the procedure to enable the air craft to land on steeper inclines than were previously possible. After lift off, as the struts extend, pressure drops in the struts, the spring 11 counter acts the pressure, forcing valve working member 9 up to the open position, equalizing the pressure in both struts. Valve 3 can now be closed for normal operations or left open for additional slope operations.

In the event that during normal operations the struts are unevenly inflated, valve 3 can be opened momentarily and closed while air borne, equalizing the inflation pressure of both struts.

Various modifications of the slope landing compensator system will become apparent to those persons ordinarily skilled in the art and the present invention is intended to cover all such obvious modifications falling within the sprit and scope of the invention as defined in the appended claims.

I claim:

1. A slope landing compensator system for allowing helicopters to land on an inclined surface while maintaining the airframe of the helicopter in a more upright attitude comprising: a main landing gear strut on each side of said airframe; each of said struts containing a fluid and pneumatic shock absorbing system including a piston and fluid and air; one of said pistons being compressed to a greater extent than the other of said pistons when said helicopter has landed on said inclined surface; said strut with said piston compressed to a greater extent forming an up slope strut and said other strut forming a down slope strut; said fluid and air in said up slope strut having a higher internal pressure than the fluid and air in said down slope strut; valve means for transferring the air from said up slope strut to said down slope strut so that said down slope strut may be extended more than said up slope strut; said valve means including a pressure responsive valve associated with a service valve receptacle on each of said struts and a pilot operated valve connecting said pressure responsive valves; each said pressure responsive valve including a valve housing, a movable working member in said housing for movement in one direction by air pressure in an amount and at a rate proportional to said air pressure to a closed position, and for movement in an opposite direction to an open position, biasing means for continuously biasing said working member in said opposite direction, means defining a valve inlet passageway, means defining a valve outlet passageway, means defining a communicating passageway between said inlet and outlet passageway means when said working member is in said open position, said working member forming a second passageway for continuous communication between said inlet passageway means and the top of the working member and a service valve receptacle in the upper portion of the valve housing, said working member having a valve position indicator pin extending from its bottom surface and being of sufficient length to extend through a bore in a biasing adjustment plug in said housing when the working member is in said closed position, said bore providing sufficient clearance between the pin and the walls of the bore to permit air to pass therethrough, guide means for said working member comprising a guide pin in said housing and a slot in said working member for providing up and down stops and radial alignment means, sealing means around the lower portion of said working member and a dust seal located in said housing adjacent said adjustment plug; said inlet passageway means of each of said pressure responsive valves communicating with one of said strut service valve receptacles through a threaded connection; and said outlet passageway means of the pressure responsive valves directly communicating with each other through said pilot operated valve for permitting said air in said up slope strut to be transferred to said down slope strut in response to the higher air and fluid pressure in said up slope strut until sufficient pressure is created to activate the pressure responsive valve associated with said up slope strut to said closed position.

* * * * *